US006940236B2

(12) United States Patent
Horng et al.

(10) Patent No.: US 6,940,236 B2
(45) Date of Patent: Sep. 6, 2005

(54) PARALLEL CONNECTED DOUBLE-PHASE FULL-WAVE BRUSHLESS DC MOTOR

(75) Inventors: Alex Horng, Kaohsiung (TW); Ching-Sheng Hong, Kaohsiung (TW); Ta-Lun Ko, Fengshan (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/638,352

(22) Filed: Aug. 12, 2003

(65) Prior Publication Data

US 2004/0239267 A1 Dec. 2, 2004

(30) Foreign Application Priority Data

May 27, 2003 (TW) ....................................... 92114289 A

(51) Int. Cl.[7] ............................ H02P 5/06; H02K 23/00

(52) U.S. Cl. ....................................... 318/254; 318/439

(58) Field of Search ................................ 318/254, 439, 318/594, 600–605

(56) References Cited

U.S. PATENT DOCUMENTS 4,093,897 A * 6/1978 Fujita et al. ................ 318/138
4,114,073 A * 9/1978 Uzuka ........................ 318/138
4,260,920 A * 4/1981 Nakamura et al. ..... 310/156.05
4,412,159 A * 10/1983 Uzuka ........................ 318/254
4,591,766 A * 5/1986 Takaba ....................... 318/254
4,633,149 A * 12/1986 Welterlin .................... 318/254
4,639,648 A * 1/1987 Sakamoto ................... 318/254
4,658,190 A * 4/1987 Miyazaki et al. ........... 318/254
4,734,627 A * 3/1988 Koerner ...................... 318/254
4,751,415 A * 6/1988 Kitamori et al. ....... 310/156.01
4,968,913 A * 11/1990 Sakamoto ............. 310/156.05
5,321,342 A * 6/1994 Kruse ......................... 318/254
5,939,807 A * 8/1999 Patyk et al. .................. 310/89
5,959,377 A * 9/1999 Horng .................. 310/40 MM
6,278,248 B1 * 8/2001 Hong et al. ................. 318/254
6,479,957 B1 * 11/2002 Erdman et al. ............. 318/254
6,573,672 B2 * 6/2003 O'Rourke et al. .......... 318/254
6,741,047 B2 * 5/2004 Horng et al. ............... 318/254
6,744,229 B2 * 6/2004 Horng et al. ............... 318/254
6,806,598 B1 * 10/2004 Horng et al. ............. 310/67 R
6,836,039 B2 * 12/2004 Choi et al. ..................... 310/81
2003/0201739 A1 * 10/2003 Horng et al. ............... 318/254

* cited by examiner

*Primary Examiner*—Marlon T. Fletcher
*Assistant Examiner*—Patrick Miller
(74) *Attorney, Agent, or Firm*—Bacon & Thomas, PLLC

(57) ABSTRACT

A parallel connected double-phase full-wave brushless dc motor includes a first drive member, a second drive member, a first sensor member, a second sensor member, a first motor coil and a second motor coil. The first drive member is connected to the first sensor member and the first motor coil, and the second drive member is connected to the second sensor member and the second motor coil. Hall signals of the first sensor member and the second sensor member are in control of an alternative direction of a first current and a second current passing through the first motor coil and the second motor coil. Thereby, the first motor coil and the second motor coil are excited in full wave. In operation, the first motor coil and the second motor coil are excited synchronous due to the parallel connection of the first motor coil and the second motor coil.

6 Claims, 3 Drawing Sheets

PARALLEL CONNECTED DOUBLE-PHASE FULL-WAVE BRUSHLESS DC MOTOR

BACKGROUND OF THE INVENTION

1. Field of the Invention

The present invention is related to a parallel connected double-phase full-wave brushless dc motor. More particularly, the present invention is related to two sensor/drive members used to control a parallel connected type of the double-phase full-wave brushless dc motor.

2. Description of the Related Art

Referring initially to FIG. 1, it illustrates a schematic circuitry of a conventional single-phase full-wave brushless dc motor. The single-phase full-wave brushless dc motor in accordance with the prior art has a drive circuit 10 for driving a single-phase full-wave coil assembly. The drive circuit 10 includes a drive member 11, a sensor member 12 and a motor coil 13. The drive member 11 is electrically connected to the sensor member 12 and the motor coil, thereby Hall sensors detected by the sensor member 12 controlling current directions of the motor coil 13. In two-way directions, the excited motor coil 13 is capable of rotating a motor rotor by full-wave manner.

However, the rated power and voltage characteristic of the drive member 11 is changed nonlinear with respect to its dimensions. In other words, if the rated power of the drive member 11 is doubled, the dimensions have an increase of more than double. Thus, the increase of the rated power of the drive member 11 must result in an extra-occupation in an inner space of the motor.

Moreover, a large rated power of the drive member 11 must result in an increase of manufacturing cost. That is, the manufacturing cost of a double rated power of the drive member 11 must be more expensive than that of two regular rated power of the drive member 11.

In order to save the inner space and to reduce manufacturing cost of the motor, an additional drive member is added into the motor. Consequently, the motor accomplishes a double increase in rated power and a reduction in manufacturing cost.

The present invention intends to provide a double-phase full-wave brushless dc motor having two drive members for controlling a parallel connected type of a double-phase full-wave coil assembly, each of the drive members provided with a small rated power. The parallel connected type of the double-phase full-wave coil assembly substitutes a single-phase full-wave motor coil. Due to the small dimensions and the low manufacturing cost, the small rated power of the drive members substitute for a large rated power of the drive member that may enhance the rated power, minimize the dimensions and reduce the manufacturing cost. In manufacture, maximum number of the drive members of the motor is equal to or less than number of poles according to design choice.

SUMMARY OF THE INVENTION

The primary objective of this invention is to provide a parallel connected double-phase full-wave brushless dc motor, which includes two drive members, each of which has small rated power adapted to control a parallel connected type of a double-phase full-wave coil assembly. Thereby, the two drive members may enhance the rated power of the double-phase full-wave brushless dc motor.

The secondary objective of this invention is to provide the parallel connected double-phase full-wave brushless dc motor, which includes two drive members that accomplishes small dimensions and low manufacturing cost. Thereby, the two drive members may minimum the dimensions and lower the manufacturing cost of the double-phase full-wave brushless dc motor.

The other objective of this invention is to provide the parallel connected double-phase full-wave brushless dc motor, which includes a parallel connected type of a double-phase full-wave coil assembly consisted of two single-phase full-wave coils. In operation, one of the single-phase full-wave coils may be actuated to thereby avoid interruption of the motor operation while the other is cut off.

The double-phase full-wave brushless dc motor in accordance with the present invention includes a first drive member, a second drive member, a first sensor member, a second sensor member, a first motor coil and a second motor coil. The first drive member is connected to the first sensor member and the first motor coil. A Hall signal of the first sensor member is in control of an alternative direction of a first current passing through the first motor coil, and thereby the first motor coil is excited in full wave. Meanwhile, the second drive member is connected to the second sensor member and the second motor coil. A Hall signal of the second sensor member is in control of an alternative direction of a second current passing through the second motor coil, and thereby the second motor coil is excited in full wave. In operation, the first motor coil and the second coil are excited synchronous due to the parallel connection of the first motor coil and the second motor coil.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 1:
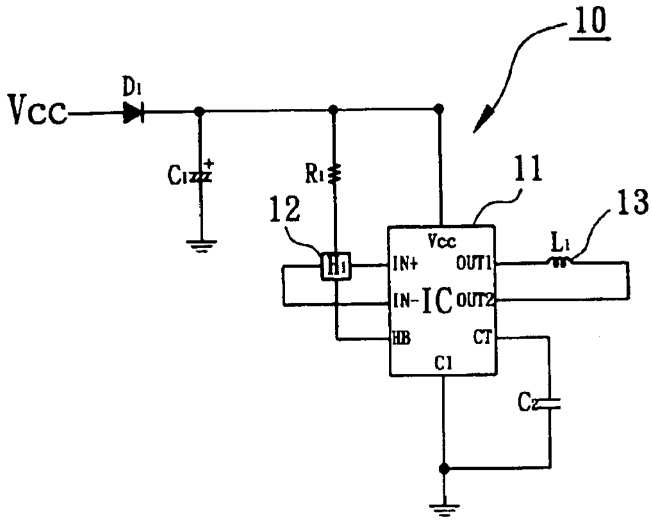
FIG. 1 is a schematic circuitry of a conventional single-phase full-wave brushless dc motor in accordance with the prior art.

Referring now to the drawings, there are four embodiments of the present invention shown therein, which include generally drive members, sensor members and motor coils.

Figure 2:
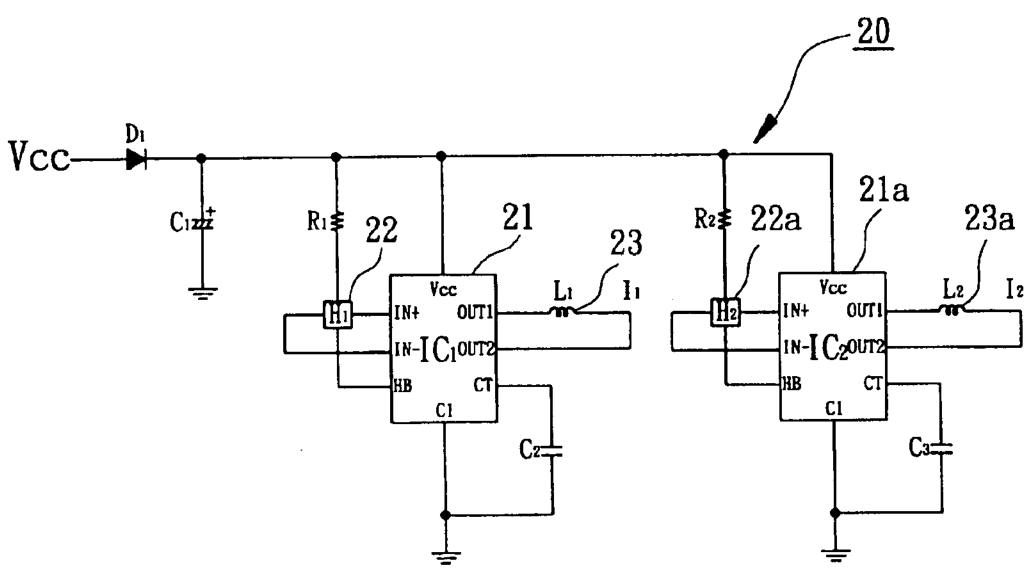
FIG. 2 is a schematic circuitry of a double-phase full-wave brushless dc motor in accordance with a first embodiment of the present invention.
Figure 3:
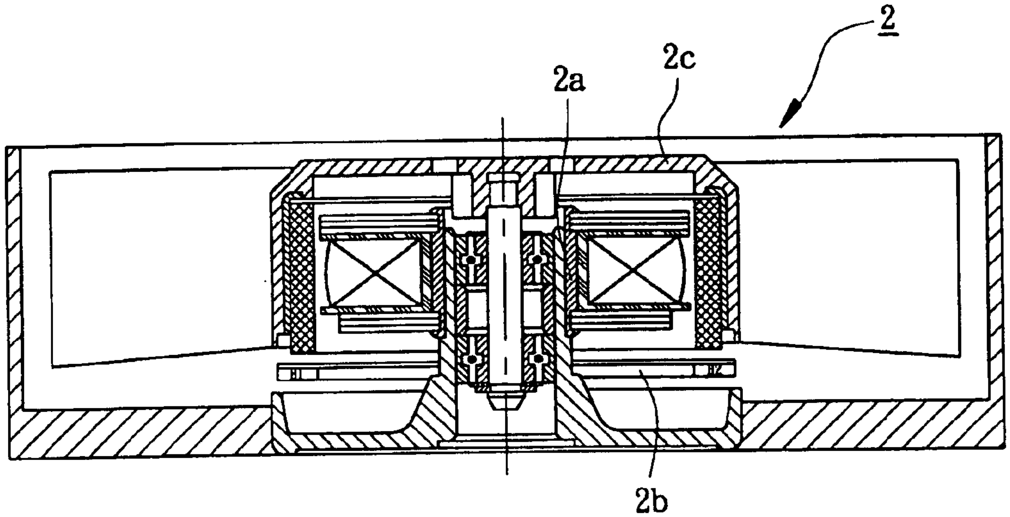
FIG. 3 is a cross-sectional view of the double-phase full-wave brushless dc motor in accordance with the first embodiment of the present invention.

FIG. 2 illustrates a schematic circuitry of a double-phase full-wave brushless dc motor having two drive members and two sensor members in accordance with a first embodiment of the present invention. FIG. 3 illustrates a cross-sectional view of a circuit board of the double-phase full-wave brushless dc motor mounting two sensor members in accordance with the first embodiment of the present invention.

Referring to FIGS. 2 and 3, a parallel connected double-phase full-wave brushless dc motor 2 in accordance with a first embodiment of the present invention has a parallel connected drive circuit 20 for driving a double-phase full-wave coil assembly. The parallel connected drive circuit 20 includes a first drive member 21, a second drive member 21*a*, a first sensor member 22, a second sensor member 22*a*, a first motor coil 23 and a second motor coil 23*a*.

Construction of the parallel connected drive circuit 20 of the double-phase full-wave brushless dc motor shall be described in detail, referring back to FIG. 2. Preferably, the rated power of the first drive member 21 is relatively small, and identical with that of the second drive member 21*a*. Also preferably, the impedance of the first motor coil 23 is further identical with that of the second motor coil 23*a* which is connected parallel to the first motor coil 23. Furthermore, the first drive member 21 is connected parallel to the second drive member 21*a* to thereby constitute the parallel connected drive circuit 20.

Referring back to FIG. 3, the double-phase full-wave brushless dc motor includes a motor stator 2*a*, a circuit board 2*b* mounted to a bottom of the motor stator 2*a*, and a motor rotor 2*c*. In manufacturing, the first motor coil 23 and the second motor coil 23*a* (shown schematically in FIGS. 2 and 4–6 but not depicted in FIG. 3) are commonly wound together to constitute a doublephase coil assembly. The parallel connected drive circuit (not shown) is disposed and incorporated into the circuit board 2*b* which is adapted to mount the first drive member 21, the second drive member 21*a*, a first sensor member 22 and a second sensor member 22*a*. In operation, the first sensor member 22 and the second sensor member 22*a* are able to detect a rotation of a permanent magnet of the motor rotor 2*c*, and thus send Hall signals to the first drive member 21 and the second drive member 21*a* respectively.

Referring again to FIG. 3, in assembling, on the circuit board 2*b*, the first sensor member 22 and the second sensor member 22*a* are chosen to locate at various positions on the circuit board 2*b* for detecting the magnetic phase of the motor rotor 2*c*. And in rotational operation, the first sensor member 22 may detect a magnetic phase of 0 degrees, 90 degrees, 180 degrees or 270 degrees of the motor rotor 2*c* leading to that detected by the second sensor member 22*a*.

Referring back to FIG. 2, the detected magnetic phase of the first sensor member 22 is designated 0 degrees or 180 degrees leading to that of the second sensor member 22*a*. Two pins OUT1 and OUT2 of the first drive member 21 are arranged corresponding to two pins OUT1 and OUT2 of the second drive member 21*a* so as to allow the first motor coil 23 and the second motor coil 23*a* to be conducted in the same directions. Thereby, the first motor coil 23 and the second motor coil 23*a* are excited in same direction to drive the motor rotor 2*c*.

Referring again to FIG. 2, the first drive member 21 and the second drive member 21*a* are commonly connected with a power source (Vcc). The first drive member 21 is connected to the first sensor member 22 and the first motor coil 23, and thus Hall signals detected by the first sensor member 22 are adapted to supply to the first drive member 21 that the conductive direction of the first motor coil 23 is controlled. Thereby, the first motor coil 23 is excited in full wave to thereby generate a full-wave magnetic field. Meanwhile, the second drive member 21*a* is connected to the second sensor member 22*a* and the second motor coil 23*a*, and thus Hall signals detected by the second sensor member 22*a* are adapted to supply to the second drive member 21*a* that a conductive direction of the second motor coil 23*a* is controlled. Thereby, the second motor coil 23*a* is excited in full wave to thereby generate a full-wave magnetic field. Consequently, the first drive member 21 and the second drive member 21*a* are connected parallel for exciting a double-phase full-wave coil assembly of the first motor coil 23 and the second motor coil 23*a* which are connected parallel.

In rotational operation, the first sensor member 22 and the second sensor member 22*a* are adapted to detect the same pole phase (N pole or S pole) of the permanent magnet of the motor rotor 2*c* synchronously. Thereby, the first drive member 21 and the second drive member 21*a* may decide alternative directions of current passing through the first motor coil 23 and the second motor coil 23*a* so that the first motor coil 23 and the second motor coil 23*a* are alternatively excited in full wave.

When the first drive member 21 allows a first current I1 to pass through the first motor coil 23, the second drive member 21*a* also allows a second current 12 to pass through the second motor coil 23*a*. Even though one of the first and second motor coils 23 and 23*a* is cut off, the other of the first and second motor coils 23 and 23*a* is actuated to avoid interruption of motor operation.

When the first motor coil 23 and the second motor coil 23*a* are synchronously conducted in full wave by the first drive member 21 and the second drive member 21*a*, the first current I1 and the second current I2 are able to pass through the first motor coil 23 and the second motor coil 23*a* respectively. Accordingly, the parallel connected drive circuit 20 allows the two currents I1 and I2 that may result in an increase of rated power. For example, if a single-phase full-wave brushless dc motor has 500 mW rated power and 700 mA rated current, and the double-phase full-wave brushless dc motor of the present invention is brought up to 1000 mW rated power and 1400 mA rated current.

Referring again to FIGS. 1 and 2, to increase rated power of the motor, the conventional drive circuit 10 of the conventional single-phase full-wave brushless dc motor must use a large, expensive drive member 11 that may result in an increase of dimensions and manufacturing cost. By contrast, the parallel connected drive circuit 20 of the present invention applies a small drive member 21 and an additional small drive member 21*a* to increase total rated power that may result in a reduction of dimensions and manufacturing cost.

Figure 4:
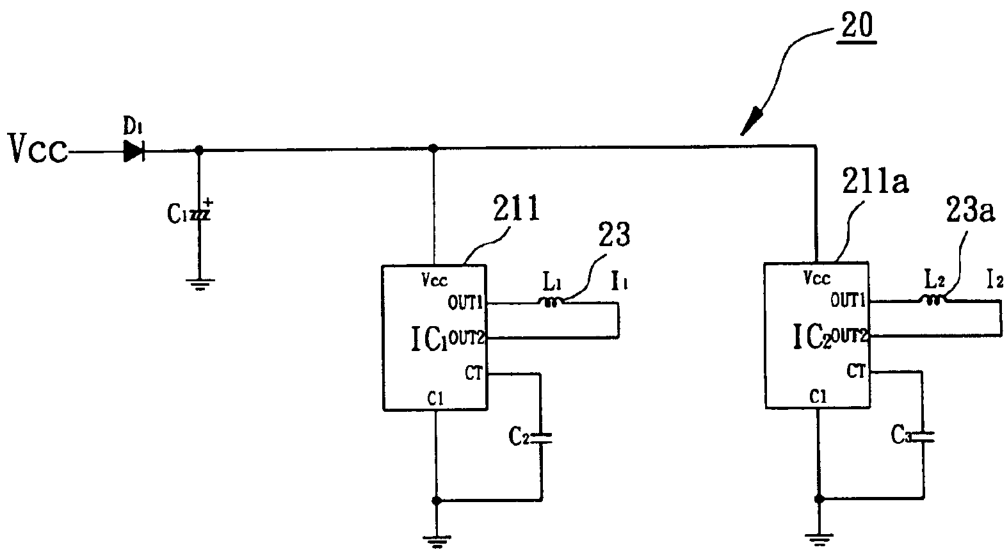
FIG. 4 is a schematic circuitry of a double-phase full-wave brushless dc motor in accordance with a second embodiment of the present invention.

FIG. 4 illustrates a schematic circuitry of a double-phase full-wave brushless dc motor having two sensor/drive members in accordance with a second embodiment of the present invention.

Referring to FIG. 4, reference numerals of the second embodiment has applied the identical numerals of the first embodiment. The double-phase full-wave brushless dc motor of the second embodiment has the similar configuration and same function as that of the first embodiment and the detailed descriptions are omitted.

Referring to FIG. 4, the parallel connected drive circuit 20 in accordance with the second embodiment includes a first sensor/drive member 211, a second sensor/drive member 211*a*, a first motor coil 23 and a second motor coil 23*a*.

In comparison with the first embodiment, incorporating a sensor member into a drive member constitutes each of the sensor/drive members 211 and 211*a* of the second embodiment.

Figure 5:
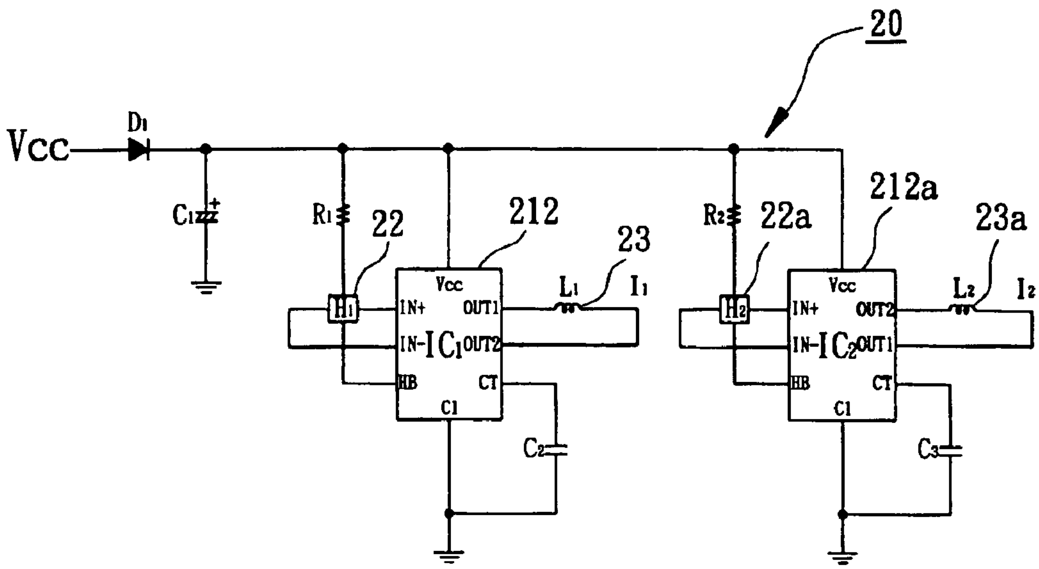
FIG. 5 is a schematic circuitry of a double-phase full-wave brushless dc motor in accordance with a third embodiment of the present invention.

FIG. 5 illustrates a schematic circuitry of a double-phase full-wave brushless dc motor having two drive members and two sensor members in accordance with a third embodiment of the present invention.

Referring to FIG. 5, reference numerals of the third embodiment has applied the identical numerals of the first embodiment. The double-phase full-wave brushless dc motor of the third embodiment has the similar configuration and same function as that of the first embodiment and the detailed descriptions are omitted.

Referring to FIG. 5, the detected magnetic phase of the first sensor member 22 in accordance with the third embodiment is designated 90 degrees or 270 degrees leading to that of the second sensor member 22*a*. In comparison with the first embodiment, a connected relationship of the second drive member 212*a* with the second motor coil 23*a* of the third embodiment is opposite to that of the first drive member 212 with the first motor coil 23. Namely, two pins OUT1 and OUT2 of the first drive member 212 are arranged opposite to two pins OUT1 and OUT2 of the second drive member 212*a* so as to allow the first motor coil 23 and the second motor coil 23*a* to be conducted in the opposite direction. Thereby, the first motor coil 23 and the second motor coil 23*a* are excited in opposite direction to drive the motor rotor 2*c*.

Figure 6:
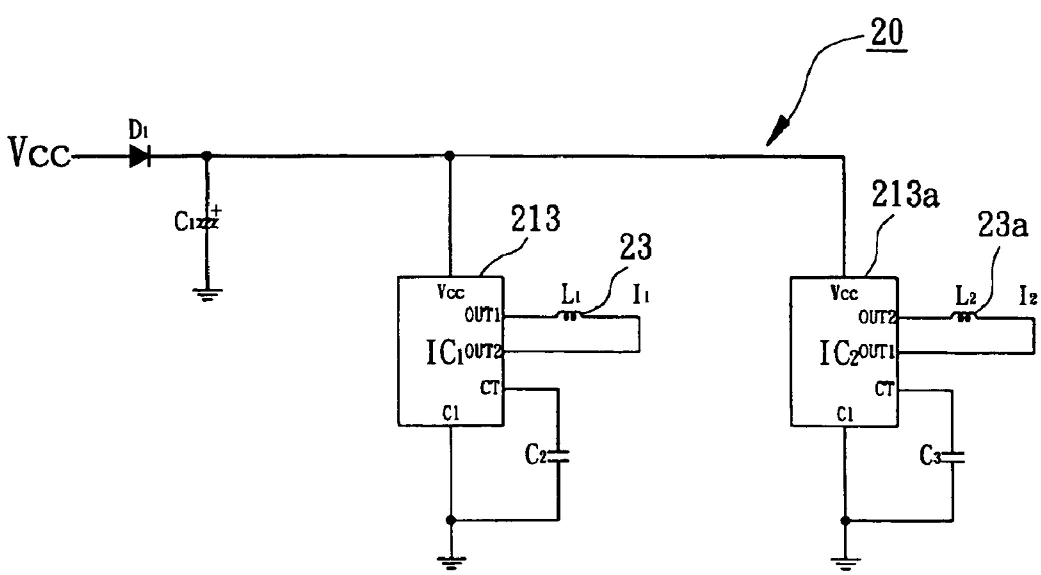
FIG. 6 is a schematic circuitry of a double-phase full-wave brushless dc motor in accordance with a fourth embodiment of the present invention.

FIG. 6 illustrates a schematic circuitry of a double-phase full-wave brushless dc motor having two sensor/drive members in accordance with a fourth embodiment of the present invention.

Referring to FIG. 6, reference numerals of the fourth embodiment has applied the identical numerals of the third embodiment. The double-phase full-wave brushless dc motor of the fourth embodiment has the similar configuration and same function as that of the third embodiment and the detailed descriptions are omitted.

Referring to FIG. 6, the serially connected drive circuit 20 in accordance with the fourth embodiment includes a first sensor/drive member 213, a second sensor/drive member 213*a*, a first motor coil 23 and a second motor coil 23*a*.

In comparison with the third embodiment, incorporating a sensor member into a drive member constitutes each of the sensor/drive members 213 and 213*a* of the fourth embodiment.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A double-phase full-wave brushless dc motor, comprising:

a motor rotor having at least one magnet set;

a motor stator having at least one pole set corresponding to the magnet set of the motor rotor;

a first motor coil wound on the motor stator;

a second motor coil wound on the motor stator and connected in parallel to the first motor coil;

a first sensor/drive member connected to a power source, and further connected to the first motor coil, the first sensor/drive member controlling a first current passing through the first motor coil according to a first Hall signal detected by the first sensor/drive member; and a second sensor/drive member connected in parallel to the first sensor/drive member, and further connected to the power source and the second motor coil, the second sensor/drive member controlling a second current passing through the second motor coil according to a second Hall signal detected by the second sensor/drive member;

wherein annular differences between the first and second sensor/drive members are 90 degrees, 180 degrees, and 270 degrees with respect to poles of the magnet set of the motor rotor such that, in rotational operation, the first sensor/drive member detects a magnetic phase that leads the magnetic phase of the second sensor/drive member by 90 degrees, 180 degrees, or 270 degrees of the motor rotor, wherein when the detected magnetic phase of the first sensor/drive member leads that of the second sensor by 90 degrees or 270 degrees, the first motor coil and the second motor coil must be controlled to conduct the first and second currents in opposite directions so that the first motor coil and the second motor coil are excited in opposite directions, and wherein the first sensor/drive member and the second sensor/drive member are commonly operated so that the first current of the first motor coil and the second current of the second motor coil are alternatively excited to thereby rotate the motor rotor.

2. The brushless dc motor as defined in claim 1, further comprising a circuit board co-axially mounted with respect to a bottom portion of the motor stator; wherein the first sensor/drive member and the second sensor/drive member are mounted to the circuit board.

3. The brushless dc motor as defined in claim 1, wherein when the detected magnetic phase of the first sensor/drive member is the same as or leads that of the second sensor/drive member by 180 degrees, the first motor coil and the second motor coil must be controlled to conduct the first and second currents in opposite directions so that the first motor coil and the second motor coil are excited in a same direction.

4. The brushless dc motor as defined in claim 1, wherein each of the sensor/drive members can be substituted by a combination of a drive member and a sensor member.

5. The brushless dc motor as defined in claim 1, wherein the first motor coil and the second motor coil are commonly wound to constitute a double-phase coil assembly.

6. The brushless do motor as defined in claim 1, wherein the first motor coil and the second motor coil are co-axially wound together to provide an axial coil set consisting of said first and second motor coils.

* * * * *